United States Patent [19]

Burling

[11] Patent Number: 5,149,647

[45] Date of Patent: Sep. 22, 1992

[54] PROCESS FOR EXTRACTING PURE FRACTIONS OF LACTOPEROXIDASE AND LACTOFERRIN FROM MILK SERUM

[75] Inventor: Hans Burling, Lund, Sweden

[73] Assignee: Svenska Mejeriernas Riksforenings Ekonomi-Aktiebolag, Stockholm, Sweden

[21] Appl. No.: 488,040

[22] PCT Filed: Nov. 25, 1988

[86] PCT No.: PCT/SE88/00643

§ 371 Date: May 24, 1990

§ 102(e) Date: May 24, 1990

[87] PCT Pub. No.: WO89/04608

PCT Pub. Date: Jun. 1, 1989

[30] Foreign Application Priority Data

Nov. 27, 1987 [SE] Sweden ............................ 8704719-7

[51] Int. Cl.$^5$ .................... C12N 9/08; C07K 3/22; C07K 13/00; A23J 1/20
[52] U.S. Cl. .................... 435/192; 530/366; 530/416; 435/815
[58] Field of Search ............... 435/192, 815; 530/366, 530/416

[56] References Cited

U.S. PATENT DOCUMENTS

| | | | |
|---|---|---|---|
| 3,896,241 | 7/1975 | Malaspina et al. ................ | 426/271 |
| 4,436,658 | 3/1984 | Peyrouset et al. ................ | 260/122 |
| 4,791,193 | 12/1988 | Okonogi et al. .................. | 530/416 |
| 4,946,944 | 8/1990 | Frankinet et al. ................ | 530/400 |

FOREIGN PATENT DOCUMENTS 2179947  3/1987  United Kingdom .

OTHER PUBLICATIONS

Chemical abstracts, vol. 105, 1986, abstract No. 41350u, J Chromatogr., 1986, 358(2), 429–433 (Eng).
Buzila et al, "The Simultaneous Preparation of the Active Components From Human Milk," *Rev. roum. Biochim.*, vol. 21, Iss. 2, pp. 81–91 (1984).
Boyer (1986) "Modern Experimental Biochemistry" pp. 49–53.

*Primary Examiner*—Douglas W. Robinson
*Assistant Examiner*—Jon P. Weber
*Attorney, Agent, or Firm*—Oblon, Spivak, McClelland, Maier & Neustadt

[57] ABSTRACT

A process for extracting pure fractions of lactoperoxidase and lactoferrin from milk serum is described. The milk serum is microfiltered and passed through a strong cation exchanger at a high rate of flow for selective adsorption of lactoperoxidase and lactoferrin, and then the lactoperoxidase and lactoferrin are eluted successively and selectively with saline solutions having different concentrations.

14 Claims, 3 Drawing Sheets

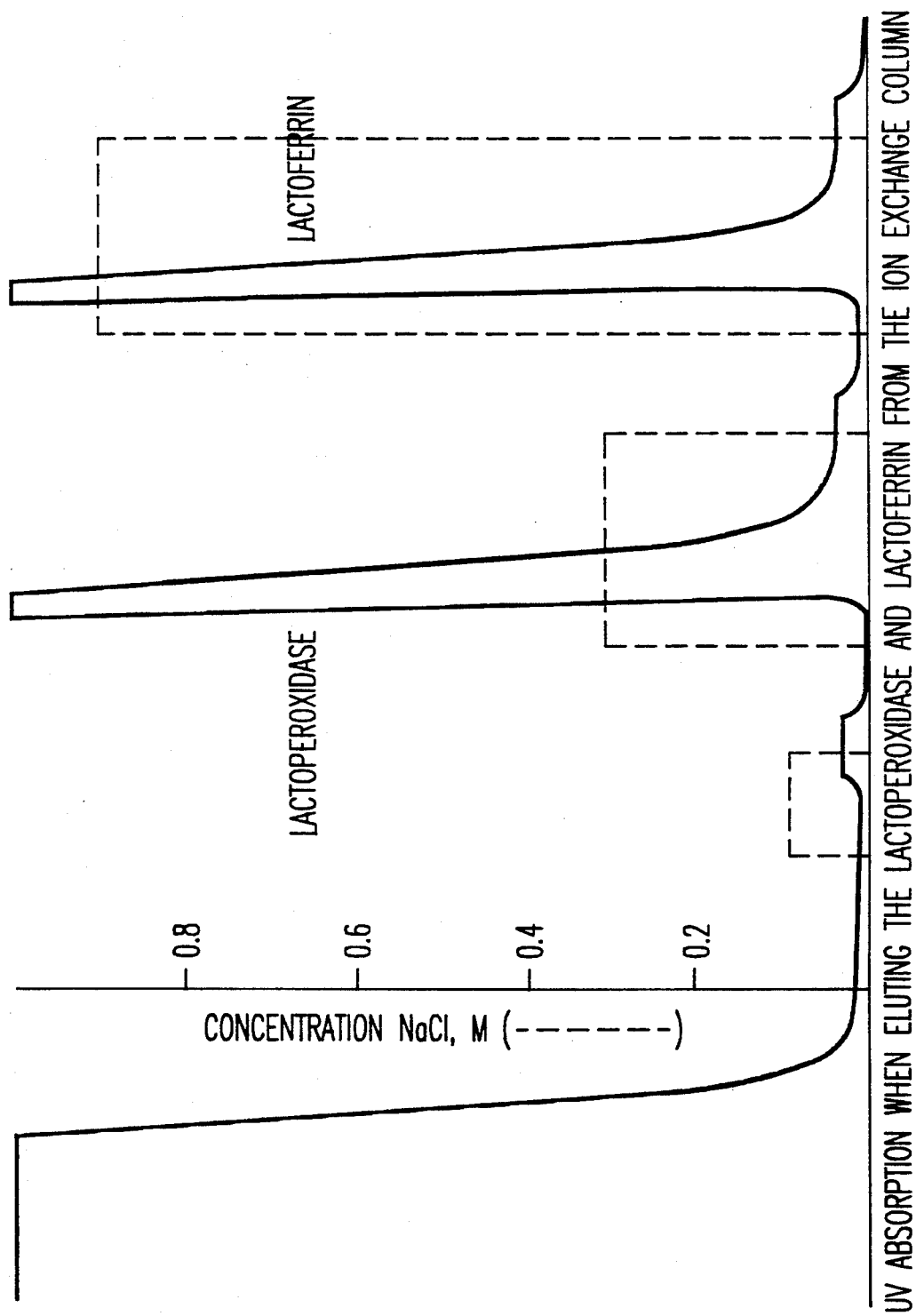

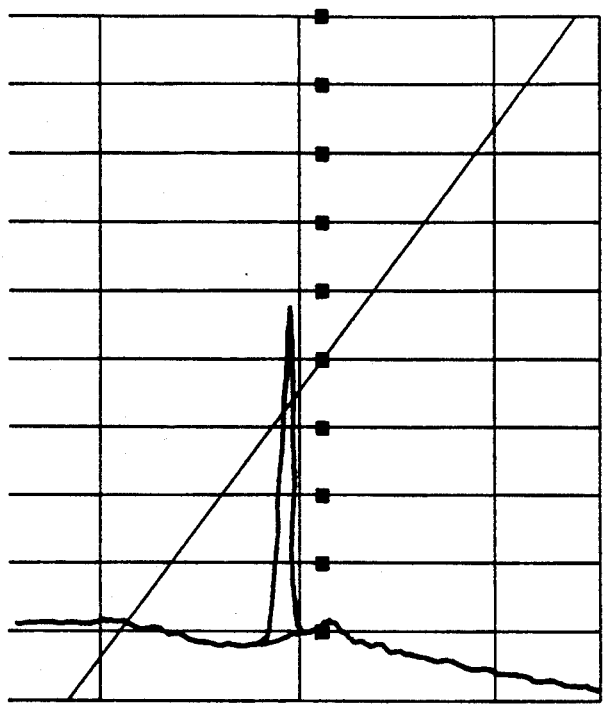
LACTOPEROXIDASE  *FIG. 3A*
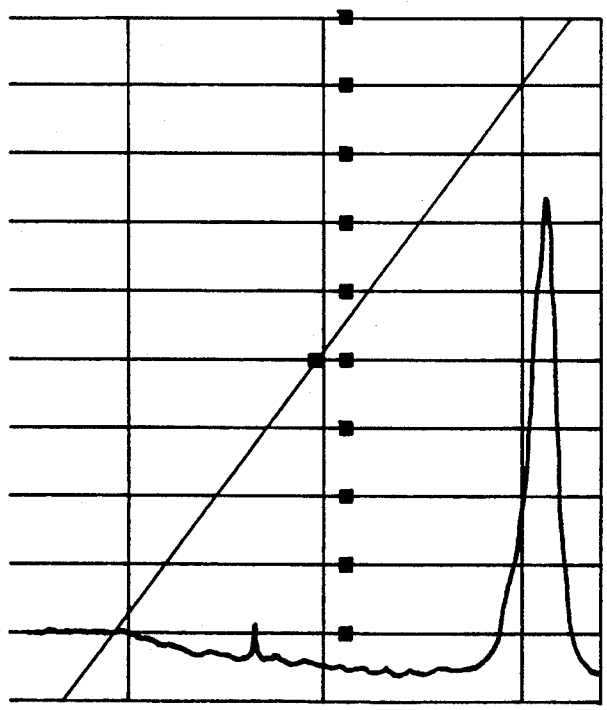
LACTOFERRIN  *FIG. 3B*

PROCESS FOR EXTRACTING PURE FRACTIONS OF LACTOPEROXIDASE AND LACTOFERRIN FROM MILK SERUM

The present invention relates to a process for extracting pure fractions of lactoperoxidase and lactoferrin from milk serum. By milk serum is meant both skim milk and whey.

In cheese-making, a large amount of whey is obtained as a by-product. Whey has a dry solids content of about 6%, which is composed approximately as follows:

|  | % by weight |
|---|---|
| Lactose | 4.6 |
| Protein | 0.6 thereof |
| Lactoperoxidase | 0.0020 |
| Lactoferrin | 0.0030 |
| Fat | 0.05 (after separation) |
| Salts | 0.7 |
| Dry solids content about | 6.0 |

The protein fraction which constitutes about 10–12% of the dry solids content is composed of a number of different protein components. The biggest are $\beta$-lactoglobulin, $\alpha$-lactalbumin and bovine serum-albumin. Also a number of bioactive components belong to the protein fraction, for example immunoglobulins, lactoperoxidase, lactoferrin and lysozyme.

Both lactoperoxidase and lactoferrin have antimicrobial properties. There is a great interest in extracting natural antimicrobial substances to be used in new contexts in food technology and in the chemico-technical and medical fields.

There are low contents of these substances in skim milk and whey (also in the original milk). Lactoperoxidase and lactoferrin are present in contents of 15–50 mg/litre, depending on the lactation state of the cow. Large quantities of whey (milk) must thus be filtered to facilitate extration of kilogram amounts of these bioactive components.

The process engineering conditions for isolating lactoperoxidase and lactoferrin, respectively, from milk/whey are based on the fact that the isoelectric point (pI) for these two proteins is about 9.5, while the main part of the whey proteins have isoelectric points around 5.1–5.4 and the casein at about 4.6. A fundamentally suitable process for separation of lactoperoxidase and lactoferrin is therefore to contact the milk/whey with a cation exchanger at a pH of <6 for selective adsorption, and use is here made of the positive net charge of lactoperoxidase and lactoferrin, which distinguishes from that of other milk proteins which have a negative charge at this pH.

The traditional way of isolating lactoperoxidase and lactoferrin in small amounts for the purpose of research is to use the precipitation technique and ion exchange chromatography, frequently combined with gel filtration, see Morrison, M., Hamilton, H-B., Stotz, E., J. Biol. Chem. 228:767 (1957); and Morrison, M., Hultquist, P-E., J. Biol. Chem. 238-2847 (1963). These methods are not suited for preparing large amounts of the bioactive components at issue in an economically defensible manner.

U.S. Pat. No. 4,436,658 (Pevrosuset) discloses adsorption of lactoferrin from casein-free milk serum (whey) by means of a silica column. The pH of the milk serum is adjusted to 7.7–8.2 before adsorption on the column. Immunoglobulins, lactoferrin and lactoperoxidase adhere to the column. After the adsorption phase, elution with a diluted saline solution at a pH of <4 takes place. No selective elution of the adsorbed proteins is obtained, particularly not regarding lactoperoxidase. A column holding about 5 g of silica compound can treat 1 litre of whey. This prior art process must be regarded as unsuitable for application on an industrial scale.

Zagulski et al. in Prace in Materialy Zootechniczne 20, (1979), p. 87–103 describes a batchwise method of obtaining lactoferrin, in which use is made of a weak cation exchanger which is mixed with milk. After equilibration, the ion exchanger is applied to a column for elution of the adsorbed proteins with a saline solution. The method thus is based on a batchwise process, and a further purification must be carried out in a second ion exchange step to obtain a high purity of the lactoferrin.

A similar process is described in BE patent specification 901,672 (J. P. Prieels and R. Peipper, Oleofina S.A.). Here, use is made of an ion exchanger based on calcium alginate, in which the ion exchange functionality has been obtained by admixture of oxides of zirconium, titanium, quartz or aluminium. The milk/whey is contacted with the ion exchanger in a packed column or by mixing in a tank, whereby proteins having an isoelectric point above 7.5 are adsorbed. After equilibration, the gel is separated mechanically and supplied to a means for washing and eluting with a calcium chloride solution. All fluids contacting the calcium alginate gel must contain at least 0.1% $CaCl_2$ to prevent the gel from being dissolved. No fractionating of lactoperoxidase and lactoferrin is obtained in the elution, but the fractionating must be carried out in a separate purification step.

As a reason for not working with a commercially established ion exchange technique in a column process, the above-mentioned BE patent specification mentions the unsurmountable difficulties of clogging of the ion exchanger caused by the occurrence of particles of globular fat and protein aggregate in the medium.

GB patent specification 2,179,947 discloses a process for the extraction of lactotransferrin from milk. The process is carried out such that the whey is subjected to ultrafiltration, whereby the protein content of the whey (including the lactotransferrin) is concentrated about 5 times, whereupon its pH and ionic strength are adjusted. The milk serum thus treated is passed at a very low rate (about 0.03 bed volumes per minute) through an ion exchange column, preferably a weak cation exchanger. The column is eluted, still at a low rate, with a solution having an ionic strength gradient which increases up to 0.4 M, when the lactotransferrin is eluted. This is a small-scale process which is not suitable for industrial preparation of lactoferrin. The use of a weak cation exchanger results in a poor capacity. Whey in an amount of 100 bed volumes, converted into a natural dry solids content, can pass through the ion exchange column between each elution. The problem of clogging of the ion exchange filter caused by fat and protein particles has not been solved by this prior art process.

The following requirements can be placed on an industrially applicable process for economic recovery of lactoperoxidase and lactoferrin from whey/skim milk:

1) High selective capacity of the adsorption mass. Since the contents of lactoperoxidase/lactoferrin are low in milk serum, the volumes of milk serum which can be treated in one elution, must be large.

2) High rate of flow in the adsorption phase. (Normal chromatographic processes usually work at low rates, 0.01-0.10 bed volumes per minute. The reason is that owing to the small particle size, the bed usually gives high pressure drops, and that the reaction kinetics for the adsorption process frequently require a high rate of flow.

3) The process must be hygienic, which means that the adsorption mass must stand at least a lye treatment at pH 13-14.

The object of the present invention is to achieve a process that satisfies the above-mentioned requirements for extraction of pure fractions of lactoperoxidase and lactoferrin from milk serum (whey) on a large scale and at a low cost.

The present invention relates to a process for extracting pure fractions of lactoperoxidase and lactoferrin from milk serum, said process being characterised by microfiltering the milk serum, passing it through a strong cation exchanger at a high rate of flow for selective adsorption of lactoperoxidase and lactoferrin, and successively eluting the lactoperoxidase and the lactoferrin selectively with saline solutions having different concentrations.

According to the invention, a process is provided for preparing pure fractions of two different serum proteins in a single ion exchange step. This has not previously been achieved on an industrial scale. Prior art methods for extracting these proteins on an industrial scale have required two or three purification steps.

The above-mentioned problems of clogging of the ion exchanger, which is caused by the occurrence of particles, such as globular fat and protein aggregates, in the serum or whey, are solved according the invention in that the milk serum (whey) is microfiltered, for example in a so-called cross-flow process, before contacting the ion exchange bed. By choosing a suitable pore size of the microfilter, fat and protein aggregate particles which cause clogging, can be eliminated. A suitable microfilter has a pore diameter of 0.10-2 μm, preferably 0.4-1.5 μm.

As the starting material for the process according to the invention, milk serum (whey) is used, i.e. milk freed from fat and casein. The milk serum is first treated by microfiltration for removal of residues of fat and protein aggregate particles, preferably in a so-called cross-flow process. The microfiltered milk serum is then passed at a high rate (about 1-1.5 bed volumes per minute) through a column packed with a strong cation exchanger which selectively adsorbs lactoperoxidase and lactoferrin. This cation exchanger has excellent rate and adsorption kinetic properties and a capacity of about 1000 bed volumes of milk serum. This means that about 1000 bed volumes of milk serum can pass before the lactoperoxidase which has the weakest bond, breaks through, i.e. the ion exchange mass is saturated with these proteins. Merely a slight increase of the pressure drop occurs between the beginning and the end of the adsorption phase.

The elution of the ion exchange mass is started by washing the milk serum out of the column with a buffer, preferably a phosphate buffer at the pH of the milk serum, 6.5. Subsequently, impurities, if any, are eluted with a buffer solution containing a weak saline solution, preferably of an inorganic alkali, alkaline earth or ammonium salt, for example 0.075 M NaCl.

After this preparatory elution, the desired proteins are selectively eluted with buffer solutions containing saline solutions selected from the above-mentioned salts, at different concentrations. Thus, the elution of lactoperoxidase is performed at a salt concentration in the range of 0.10-0.4 M, and of lactoferrin at a salt concentration within 0.5-2 M.

After this treatment, the proteins concerned have been concentrated about 500 times.

The pure protein fractions are collected, and then a further concentration is preferably effected by ultrafiltration followed by desalination and freeze-drying so as to obtain a commercial product consisting of about 90% pure protein fractions.

For the production of 1 kg lactoperoxidase and 1 kg lactoferrin, about 65 and, respectively, 45 $m^3$ of whey are required. The purity of the extracted components exceeds 90%. This is obtained by a suitable choice of ion exchanger and a careful choice of adsorption and elution conditions in which the pH and the salt concentrations are important parameters.

The invention will now be described in detail by means of the Example below and the accompanying drawings.

FIG. 2 illustrates the UV absorption spectrum when eluting lactoperoxidase and lactoferrin from an ion exchange column; and FIGS. 3a and 3b are chromatograms showing the purity of lactoperoxidase and lactoferrin after the fractionating according to the invention has been carried out.

Figure 1:
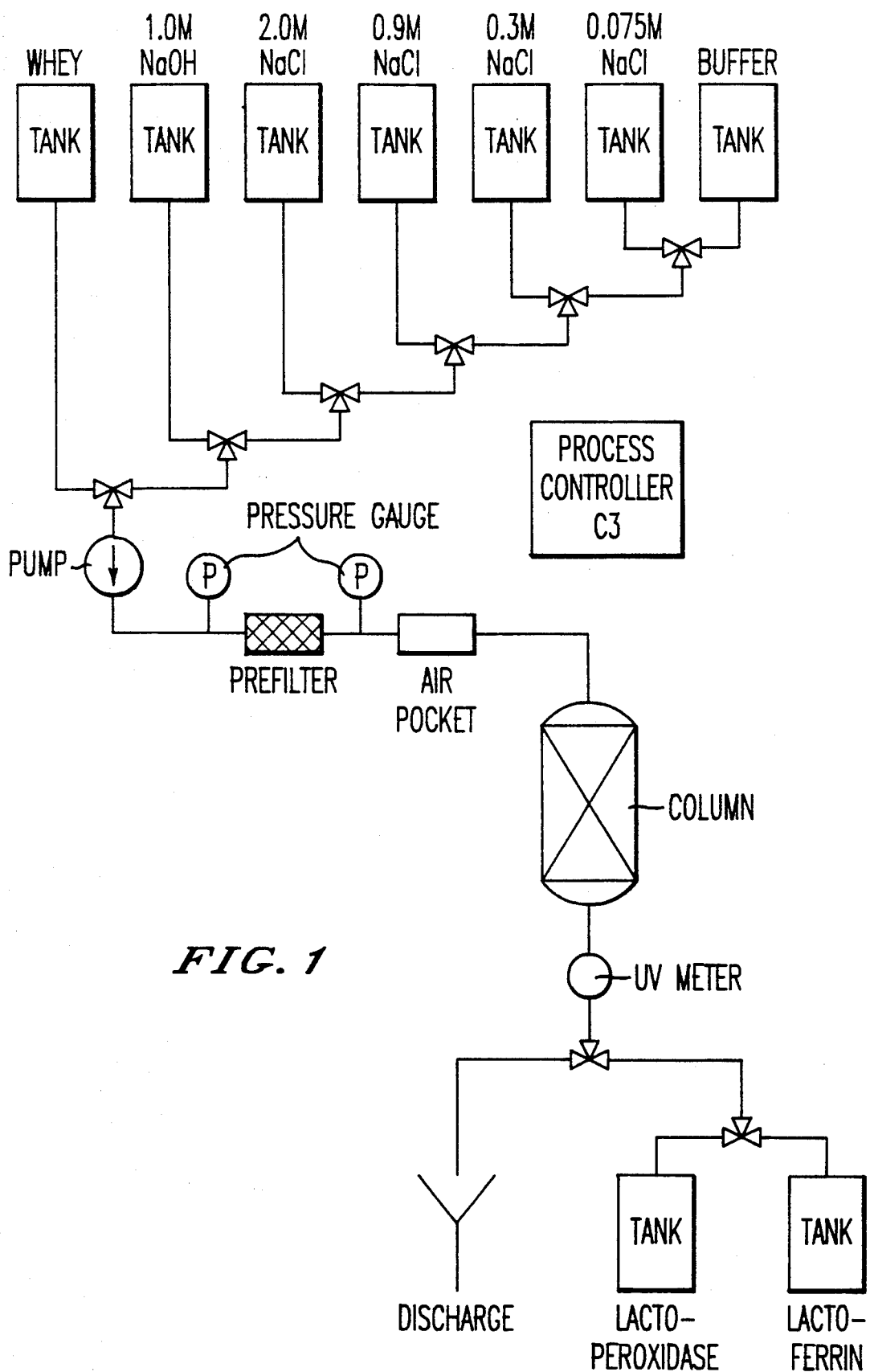
FIG. 1 is a schematic view of a preferred embodiment of the process according to the invention.

EXAMPLE 100 litres of pasteurised and sludge-centrifuged sweet whey at pH 6.5 were microfiltered in a cross-flow process at 50° C. By the microfiltration, remaining residues of globular fat were removed together with occurring protein aggregates. The pore size of the microfilter was 1.4 μm.

After cooling, the whey was passed through an ion exchange column packed with 80 ml of a specially treated strong cation exchanger (S-Sepharose, fast flow, Pharmacia) on an agarose basis. The height of the bed was about 4.1 cm, and the rate through the column was 100 ml/minute, corresponding to a rate of 1.25 bed volumes per minute. The pressure drop before the column at the beginning of the run was 0.26 bar. 15 h later, the rate was still 100 ml/minute at a pressure drop of 0.28 bar. The lactoperoxidase break-through occurred when about 80-90 litres of whey had been passed through the column, i.e. about 1000 bed volumes.

Subsequently, the flow of whey was interrupted, and the eluting phase was started by washing the whey out of the column with a phosphate buffer, 0.01 M $KH_2PO_4$, pH 6.5, followed by elution of impurities from the ion exchanger with a phosphate buffer containing 0.075 M NaCl (FIG. 1). The lactoperoxidase was eluted with a phosphate buffer containing 0.3 M NaCl, and then the lactoferrin was eluted with a phosphate buffer containing 0.9 M NaCl (see FIG. 2).

After the fractions had been collected, they were desalted by gel filtration in a Sephadex column and were finally freeze-dried.

The ion exchange column was cleaned by washing first with 2.0 M NaCl and then with 1.0 M NaOH, whereupon the column was ready for the next run.

| | |
|---|---|
| Yield of lactoperoxidase after ion exchange: | 96.5%. |
| Purity of the collected fraction after elution: | $A_{412}/A_{280} = 0.84$* |
| Total yield in the process after freeze-drying, calculated as activity: | 90% |
| Purity of the freeze-dried preparation: | $A_{412}/A_{280} = 0.87$* |

*0.92 is the maximum quota for 100% purity.

The corresponding yield and purity were obtained for the lactoferrin (see FIGS. 3a and 3b).

I claim:

1. A process for extracting pure fractions of lactoperoxidase and lactoferrin from milk serum, comprising initially microfiltering the milk serum, then passing it through a bed of a fast flow type strong cation exchanger at a high rate of flow of about 1-1.5 bed volumes/minute for selective adsorption of lactoperoxidase and lactoferrin, and then successively and selectively eluting the lactoperoxidase with a saline solution having a concentration of 0.10-0.4 M at a pH of about 6.5 and the lactoferrin with a saline solution having a concentration of 0.5-2 M.

2. The process as claimed in claim 1, where prior to the elution of lactoperoxidase, the cation exchanger is eluted with a saline solution having a concentration of 0.01-0.15 M.

3. The process as claimed in claim 1 or 2, wherein that the pH of the milk serum is adjusted to 5.9-9.0, preferably about 6.5, before being passed through the cation exchanger.

4. The process as claimed claim 1 wherein the microfiltration is carried out in a microfilter having a pore diameter of 0.10-2 μm.

5. The process as claimed claim 1 wherein the saline solutions with eluted lactoperoxidase and lactoferrin, respectively, are concentrated, desalted and freeze-dried.

6. The process as claimed in claim 2, wherein the microfiltration is carried out in a microfilter having a pore diameter of 0.10-2 μm.

7. The process as claimed in claim 3, wherein the microfiltration is carried out in a microfilter having a pore diameter of 0.10-2 μm.

8. The process as claimed in claim 1, wherein the microfiltration is carried out in a microfilter having a pore diameter of 0.4-1.5 μm.

9. The process as claimed in claim 2, wherein the microfiltration is carried out in a microfilter having a pore diameter of 0.4-1.5 μm.

10. The process as claimed in claim 3, wherein the microfiltration is carried out in a microfilter having a bore diameter of 0.4-1.5 μm.

11. The process as claimed in claim 2, wherein the saline solutions with eluted lactoperoxidase and lactoferrin, respectively, are concentrated, desalted and freeze-dried.

12. The process as claimed in claim 3, wherein the saline solutions with eluted lactoperoxidase and lactoferrin, respectively, are concentrated, desalted and freeze-dried.

13. The process as claimed in claim 4, wherein the saline solutions with eluted lactoperoxidase and lactoferrin, respectively, are concentrated, desalted and freeze-dried.

14. The process of claim 2 wherein said salt solution is a solution of an inorganic alkali, alkaline earth or ammonium salt.

* * * * *